Aug. 17, 1965  P. NARBUT ETAL  3,201,727
INDUCTIVE APPARATUS FOR UTILIZING GASEOUS DIELECTRICS
Original Filed Sept. 12, 1958  3 Sheets-Sheet 1

INVENTORS
Paul Narbut, Gregory A. Monito
and Paul Voytik.
BY
Clement L. McHale
ATTORNEY

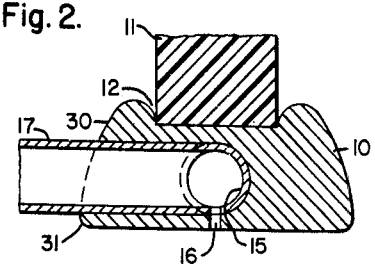
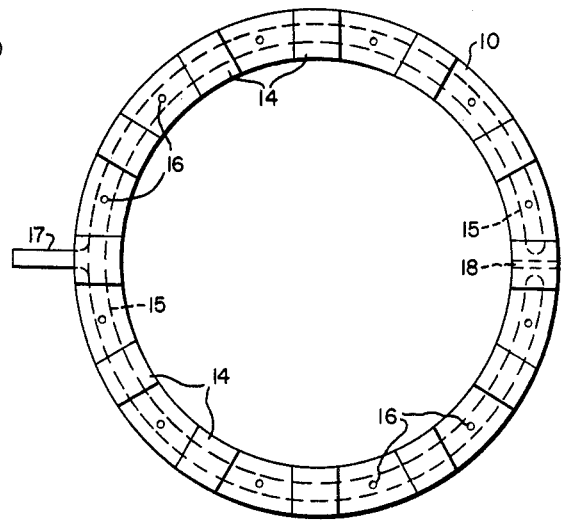
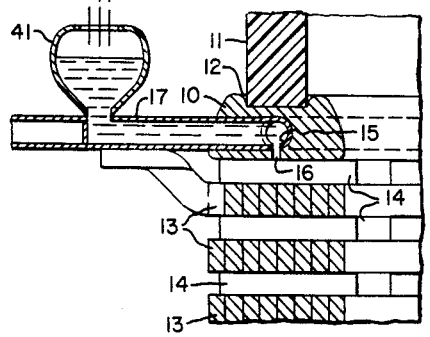
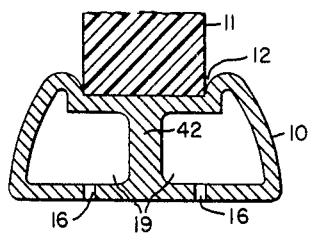
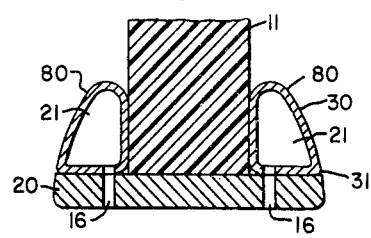

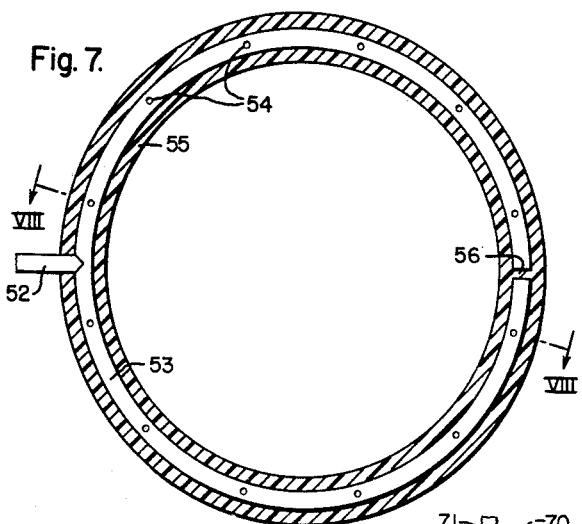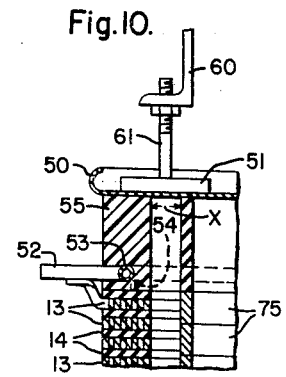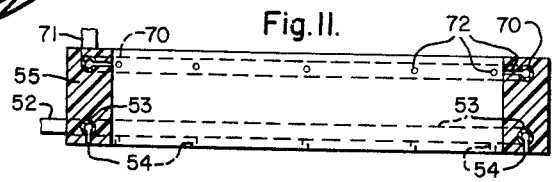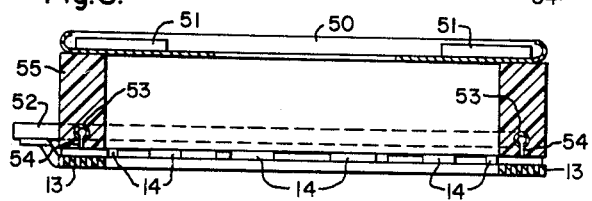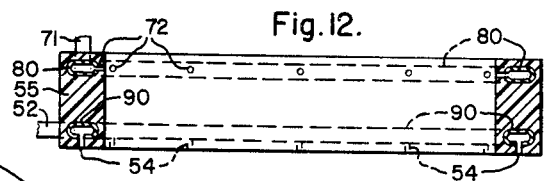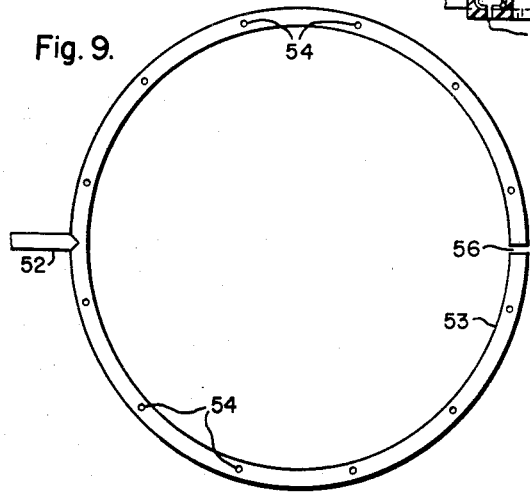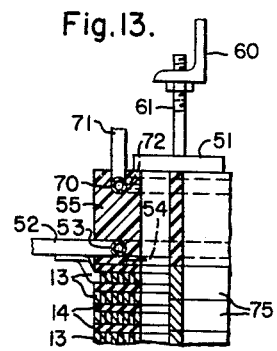

United States Patent Office 3,201,727
Patented Aug. 17, 1965

3,201,727
INDUCTIVE APPARATUS FOR UTILIZING GASEOUS DIELECTRICS
Paul Narbut, Sharpsville, Gregory A. Monito, West Middlesex, and Paul Voytik, Sharpsville, Pa., assignors to Westinghouse Electric Corporation, East Pittsburgh, Pa., a corporation of Pennsylvania
Original application Sept. 12, 1958, Ser. No. 760,743. Divided and this application June 21, 1961, Ser. No. 118,629
6 Claims. (Cl. 336—57)

This application is a division of the applicants' parent application filed Sept. 12, 1958, Serial No. 760,743, now abandoned, and assigned to the assignee of the instant application.

This invention relates generally to inductive apparatus utilizing gaseous dielectric and vaporizable coolant, and more particularly to means for obtaining a high dielectric strength of the gaseous insulation, and to means for distributing the said liquid coolant in gas-insulated and vapor-cooled transformers and inductive apparatus.

In building inductive apparatus for utilizing an electronegative gaseous dielectric and particularly a fluorine-containing gaseous dielectric, tests have revealed that solid insulating barriers between high and low voltage windings and between high and low voltage windings and ground lower the impulse voltages at which corona and flash-over occur. Therefore, when a fluorine-containing gaseous dielectric is to be employed, inductive apparatus will be built without solid insulation between the high and low voltage windings and between the high and low voltage windings and ground.

Further, it has been found highly desirable to make the windings or coils and other members to present rounded or curved parts where they ordinarily present square corners and angular or sharp edges. The parts of the windings and other members that ordinarily have square corners and sharp edges, but in this structure rounded, will be hereinafter referred to as rounded corners and edges.

Even though the coils and other members to be described hereinafter are provided with round corners and edges, it has been found that solid insulation disposed between the high and low voltage windings or between the high and low voltage windings and ground is detrimental when the coils are used in a gaseous dielectric containing fluorine. Therefore, in order to provide a coil stack or winding with high flashover values and corona resistance in transformers or other inductive apparatus utilizing a fluorine-containing gaseous dielectric, the transformer should be constructed without solid insulation barriers and with coils and cores that have rounded corners and edges which will not cause a concentration of electrical stresses.

Such a coil stack as described above is disclosed in a copending application Serial No. 701,217, entitled "Inductive Apparatus for Utilizing Gaseous Dielectrics," filed December 6, 1957, now Patent No. 3,026,492, assigned to the same assignee as the present invention. In this specification when reference is made to an electronegative gaseous dielectric, a gas, such as sulfur hexafluoride, or the electrically insulating vapors of fluorinated compounds such as perfluorocyclic ether, $C_8F_{16}O$, or those disclosed in Patent 2,561,738, issued July 24, 1951, is intended.

In inductive apparatus utilizing gas insulation and vaporization cooling, problems arise in properly distributing the liquid coolant, such as perfluorocyclic ether, over the high voltage and low voltage winding stacks for best cooling results.

It is an object of this invention to provide improved apparatus for cooling liquid distribution in gas insulated and vapor cooled inductive apparatus.

It is a further object of this invention to provide improved apparatus for distributing cooling liquid in gas insulated and vapor cooled inductive apparatus which also offers high resistance to flashover and will have a high corona level.

Further objects of this invention will become apparent when the following description is taken in conjunction with the accompanying drawings. In said drawings, for illustrative purposes only, there are shown preferred forms of the invention.

FIG. 2 is a cross section of an apparatus for distributing cooling liquid embodying the teachings of this invention;

FIG. 3 is a bottom plan view of the apparatus illustrated in FIG. 2;

FIG. 4 is a cross-sectional view of the apparatus of FIG. 2 showing means for supplying a liquid dielectric coolant to the apparatus of FIG. 2;

FIG. 5 is a cross section of a second embodiment of the teachings of this invention;

FIG. 6 is a cross section of a third embodiment of the teachings of this invention;

FIG. 7 is a cross section of a fourth embodiment of the teachings of this invention;

FIG. 8 is a cross section of FIG. 7 taken at the points VIII—VIII;

FIG. 9 is a plan view of a portion of the apparatus of FIG. 7;

FIG. 10 is a cross-sectional view of the apparatus of FIG. 7 as it may be assembled in a transformer;

FIG. 11 is a cross section of a fifth embodiment of this invention;

FIG. 12 is a cross section of a sixth embodiment of this invention; and

FIG. 13 is a cross section of the apparatus of FIG. 11 as it may be assembled in a transformer.

Figure 1:
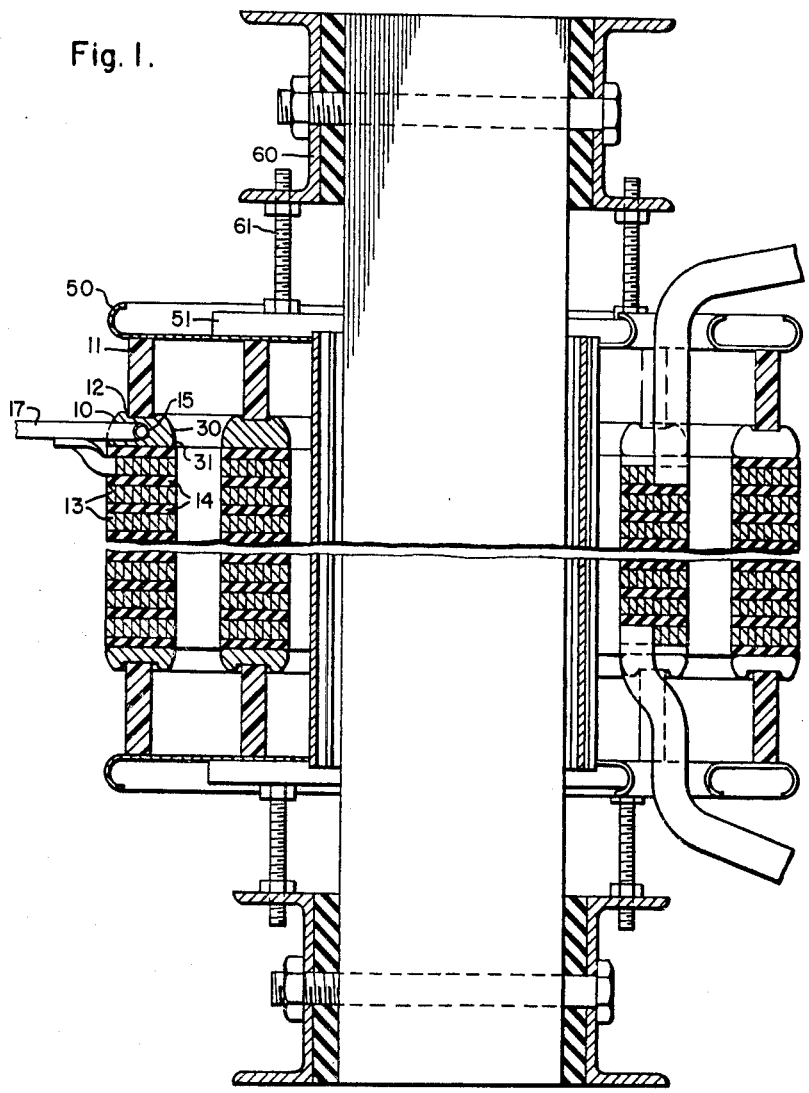
FIGURE 1 is a view in section of a preferred dielectric structure for high voltage gas insulated transformers.

Referring to FIG. 1, there is shown a preferred dielectric structure for high voltage gas insulated transformers as described in the above-referenced copending application Serial No. 701,217. The copending application Serial No. 701,217 reveals that flashover voltage from the high voltage winding stacks made up by the high voltage coil sections 13 is substantially improved if the stack is terminated at the top and bottom by static rings or plates 10 having rounded edges as shown in FIG. 1 which replaces the sharp corners of similar apparatus in prior art and raises the resistance to flashover due to impulse voltages. In practice, the radii of the curved or rounded edges of the static plates or rings 10 should be made as large as possible and will depend to some extent on the size of the transformer. That is, the radii designated by the reference character 30 should be made as large as is commensurate with its size to prevent concentration of electrical stresses. The radii designated by the reference character 31 may have a small radius of curvature.

It has also been discovered that when using gaseous dielectrics containing fluorine that the radial spacers 14 utilized between the high voltage coil sections 13 should not extend radially beyond the layers of conductors of the coil sections 13. Thus, in FIG. 1 the radial spacers 14 are shown as aligned with the high voltage coil sections 13.

With solid insulation excluded from the radial space between high and low voltage windings or between the windings and ground, the necessary mechanical supports for the windings are provided at the top and bottom ends of the windings in the form of the pressure collars 11. It is found by tests that the form and position of this supporting pressure collar 11 with respect to the static ring 10 greatly affects the flashover voltage. It was apparent from these tests that any lateral displacement or extension of the supporting pressure collar surface radially beyond the area of contact with the static ring 10 was detrimental to the resistance to flashover and should not be used. Since the shape of the cross section of the static ring 10 is modified to advantage by flattening the surface facing the layer of the windings 13 permitting the large radius 30, the pressure collar 11 may be disposed with respect to the static ring 10 as shown in FIG. 1. That is, the static plate surface of the ring 10 facing axially away from the stack of coils 13 may be grooved as at 12 to receive the pressure collar 11 as shown in FIG. 1. This grooving will effect an improved anchoring of the pressure collar 11 in the static plate 10. In order to improve the mechanical and electrical characteristics of the static ring 10 and pressure collar 11 combination, the groove 12 may be filled with an insulating and bonding compound, many of which are known to those skilled in the art. The pressure collar 11 is to be made from an insulating material. The static ring 10 will be made of a material which has good electrical conducting capacity, at least on its surface, and mechanical strength to give adequate support to the windings. Metal such as steel or aluminum has been utilized with good success. In order to prevent the circulation of eddy currents in the static plate or ring 10, it will be provided with a radially extending slit or gap 18 as shown in the plan view in FIG. 3. All static plates or conducting rings 10 to be described hereinafter will be made in the same manner, having slits or gaps for preventing the circulation of eddy currents. The static ring 10 is also to be electrically connected to the upper lead of the topmost high voltage coil and to a common lead which will preferably be of circular cross section.

The pressure collars 11 to be used in combination with the static rings 10 may be constructed from any suitable, mechanically strong insulating material, such as bonded pressboard, bonded paper, or an organic or silicone resin reinforced with fiberglass.

The preferred dielectric structure for high voltage gas insulated transformers as shown in FIG. 1 and as just described is disclosed in detail in the above-referenced copending application Serial No. 701,217. Referring to FIG. 2, there is shown a preferred embodiment of the teachings of this invention. The apparatus of FIG. 2 shows the same cross section of the static ring 10 as was disclosed in FIG. 1. However, the static ring 10 has formed therein an internal canal 15, an inlet 17 for a cooling liquid and a series of orifices 16 in the bottom of the static ring. This is perhaps shown more clearly with reference to the plan view of FIG. 3.

Although the primary function of the static ring or shield 10, as previously described, is to improve the flashover value of the gas clearances, if the ring is made of metal of adequate cross section, it performs also the same function as a pressure ring, i.e., it assists in the distribution of pressure from the pressure plates or collars. With the modifications herein described, in vapor cooled transformers, it will also perform a function of distributing cooling liquid evenly around the circumference of high voltage and other windings.

In order to accomplish this, the static ring 10 is provided with the internal canal 15, an inlet 17 for the cooling liquid, said inlet 17 simultaneously serving as the high voltage winding tubular bus terminal, and a series of orifices 16 in the bottom of the static ring. The number of orifices 16 may well be equal to, or be a multiple of, the number of the columns of radial spacers 14 in the high voltage stack. This will permit locating the orifices 16 so that none of them will be blocked by the radial spacers 14, such as shown in FIG. 3. Such a hollow static ring 10 need only be used at the top of the high voltage coil stack. Thus, it may be seen that the cooling liquid introduced into the inlet 17 will flow into the internal canal 15 and be evenly distributed around the stack of high voltage coil sections 13 to run down the stack of high voltage coil sections 13, permitting cooling of said sections by evaporation. The arrangements and structures shown in the embodiments of this invention may be, as stated hereinbefore, utilized with low voltage or other windings in said inductive apparatus.

Provision must be made to feed the cooling dielectric liquid into canal 15 so as to maintain the insulation level to ground. This provision excludes the possibility of using metal pipe connected to the static shield inlet 17 for supplying the cooling liquid. However, at least two possible ways of accomplishing this are described below.

One way of supplying the cooling liquid is through a section of insulating pipe or hose of adequate length connected to the static shield inlet 17. The connection of the insulating supply pipe or hose can be made at any convenient point of the high voltage tubular bus 17 terminating at the upper static shield of each high voltage coil stack. This arrangement, being obvious, is not shown.

Another way of supplying the cooling liquid is by means of a free stream as illustrated in FIG. 4. The liquid is discharged from a supply pipe 40 as a free stream and enters a receptacle 41 which catches the stream and conveys it into the static ring canal 15 by gravity. Receptacle 41 may be made of spun metal and designed to avoid sharp edges and corners to prevent the flashover and corona effects obtained from sharp edges and corners as hereinbefore described. As an alternative receptacle 41 may be made of insulating material.

In using the arrangement shown in FIG. 4, there is an added advantage of low pressure flow at the orifices 16. This removes the objection to a forced spray and the possible erosion effect of said forced spray on insulation around the high voltage stacks 13.

Referring to FIG. 5, there is shown a second embodiment of the teachings of this invention in which double canals 19 are formed in the static ring 10 leaving a center section 42 for more adequate mechanical strength. The use of the double canals 19 would increase the capacity of distribution through the plurality of orifices 16.

Referring to FIG. 6, there is shown a third embodiment of the teachings of this invention in which static rings or shields 80 are formed having two internal canals 21. The shields 80 rest upon a pressure plate 20 and allow the insulating pressure collar 11 to be disposed within the static shields 80 to rest upon the pressure collar 20. It is to be noted that the combined form of the pressure collar 20 and the static shields 80 retains the same large radii 30 and small radii 31 as illustrated and described in FIG. 1. The orifices 16 allowing distribution of the cooling liquid from the canals 21 must now be formed through both the pressure collar 20 and into the static rings or shields 80.

The method of manufacturing of the desired cross sections shown in FIGS. 2, 5 and 6 may be any one of several methods well known to those skilled in the art. The cross section of FIG. 2 lends itself to a manufacture by casting. The canal core 15 may be formed by a tubular ring fabricated of a higher melting point (e.g., steel) than the body of the static plate (e.g., aluminum), and the orifices 16 drilled subsequent to the casting operation. The cross section shown in FIG. 5 lends itself to an extrusion and a subsequent forming into a circle. The cross section of FIG. 6 may be fabricated from a steel plate and rolled tubular forms. Other methods of manufacture may be used.

Referring to FIGS. 7, 8 and 9, there is shown a specific construction of a static shield-pressure collar combination embodying the teachings of this invention. Referring to FIG. 7, there is illustrated a tubular conductor 53, which is shown separately in FIG. 9. The member 55 enclosing conductor 53 is made up of a suitable insulating molding or casting compound, which is in a liquid form when used and which sets to a hard strong consistency after being mixed with a catalyst and properly cured at a high temperature. Generally, the static shield conductor 53 is connected to aline lead of the high voltage coil as hereinbefore described and is disposed within the compound 55 so as to be in close proximity to the high voltage windings 13 as shown in FIG. 8. The member 55 is molded into a hollow cylinder having an outside and inside dimensions approximately the same as the high voltage coil stack. An inlet 52 is to be connected to the canal within the static shield conductor 53 in a manner as hereinbefore described. The orifices 54 may be drilled through the member 55 to provide outlets for the cooling liquid as shown in FIG. 8. The inlet 52 serves simultaneously as the high voltage lead as hereinbefore described and as an inlet for the cooling liquid to the hollow shield conductor 53. Also, as hereinbefore described, a gap 56 is provided in the tubular conductor 53 to prevent circulating currents in said conductor 53.

There are a variety of known suitable compounds, such as those generally belonging to the class of epoxy resins, which may be used in the construction of the pressure collar-static shield combination illustrated in FIGS. 7, 8 and 9. Satisfactory static shield-pressure rings, having for example 30 inches in outside diameter, were cast out of a suitable epoxy resin mixed with 60% of solid powder filling material, catalyzed to set at room temperature and postcured at elevated temperature in an oven.

Electrical tests were made on two model assemblies to determine if the use of the cast shield is beneficial, and if so, to what extent. Both assemblies used cast pressure collars of the same dimensions, and were identical in all respects except that one of the assemblies had solid collars without a static shield conductor 53, whereas the other assembly had a static shield tubular conductor 53 molded into the pressure collar 55 as shown in FIGS. 7 and 8. The tests were made in the atmosphere of sulfur hexafluoride gas at pressures of 0, 7½, and 15 p.s.i.g. and consisted of measuring the impulse voltage required to flash over either the radial clearance from the high voltage coil to the coaxial low voltage coil (designated as clearance X below), or the clearance from the high voltage coil to the ground end plates 51 shown in FIG. 8. The results were given in the tabulation below which gives the ratio of dielectric strength of the assembly with the static shield conductor 53 to that of the assembly without this conductor 53 for otherwise identical test conditions.

| Gas Atmosphere | Clearance X, inches | Ratio of Flashover Voltage |
| --- | --- | --- |
| 0 p.s.i.g. of $SF_6$ | 1 | 1.31 |
| | 1½ | 1.27 |
| | 2 | 1.32 |
| 7½ p.s.i.g. of $SF_6$ | 1 | 1.29 |
| | 1½ | 1.31 |
| | 2 | 1.42 |
| 15 p.s.i.g. of $SF_6$ | 1 | 1.27 |
| | 2 | 1.44 |

It is aparent that the presence of the embedded conductor 53 in the pressure collar 55 results in improvement in the flashover value amounting to 30 or 40%. This is a substantial and important increase. The following advantages are attained from the embodiment illustrated in FIGS. 7, 8 and 9. The pressure collar-static shield combination is simple and inexpensive to manufacture. The combination effectively performs the following functions: (a) insulating pressure collar, (b) electrostatic shield, improving the flashover voltage value of the major insulation clearances, and (c) provides a manifold to secure an even distribution of the cooling liquid in the high voltage winding of vapor cooled transformers. The combination allows the static shield conductor 53 to serve as a mechanical reinforcement for the cast pressure collar 55. The construction of the combination described lends itself readily to application to any radial width of the high voltage coils, even though this may be quite narrow.

Referring to FIG. 10, there is shown a section view of how the apparatus of FIGS. 7, 8 and 9 may be disposed in a transformer apparatus. An end frame channel 60 suitably connected or attached to a tank containing the inductive apparatus has attached thereto a pressure bolt 61 which bears upon a pressure plate 51. The pressure plate 51 bears upon the top of the pressure collar-static shield combination of FIGS. 7 and 8. The pressure collar-static shield combination is disposed on top of the high voltage coil sections 13 which are separated by a plurality of radial spacers 14. The end ground shield 50 is disposed between the pressure plate 52 and the pressure collar-static shield combination. The end ground shield 50 may be an annular plate curved upwardly at the outer periphery. The end ground shield 50 is so disposed that it will serve to improve the flashover voltage from the windings to ground. The annular end ground shield 50 should have a slit or gap similar to the gap shown in the static shields hereinbefore described to prevent the circulation of eddy currents. For a more complete description of the construction and operation of the end ground shield 50, reference is made to the aforementioned copending application Serial No. 701,217.

The structure shown in FIG. 10 involves the use of the end ground shield 50 which must extend around the complete circumference of the pressure collar-static shield combination. The use of the ground shield 50 is essential in order to give a high value of the dielectric flashover voltage to ground. Tests on experimental model assemblies show that when the ground shields 50 are omitted and the pressure plate or plates 51 are applied directly to the pressure collar-static shield combinations, the dielectric flashover voltage from the high voltage coil to ground is substantially reduced. It is desirable to devise a structure which eliminates the need for the ground shields 50. The elimination of the shields 50 would save the cost of the shields and also reduce the core opening required which must be larger when the shields 50 are used. When used in dry-type gas-filled transformers, elimination of the ground shields 50 also appears desirable because the shields 50 are likely to interfere with the cooling gas circulation. All these objects and advantages are obtained by the use of the structures described below.

FIG. 11 shows one form of construction of a pressure 53 and 70. Referring to FIG. 11, the tubular conductor 53 is embedded in the insulating molding or casting compound 55 as hereinbefore described. Inlet 52 is the high voltage lead for this conductor. In operation, the tubular conductor 53 is connected to the line lead of the high voltage coil and the inlet 52 preferably serves as a common lead for the high voltage coil in the shielding conductor 53. Tubular conductor 70 is a second shielding conductor, normally grounded through its inlet 71, also embedded in the insulating compound 55. The tubular conductors 70 and 53 are disposed to have a maximum insulating clearance therebetween, consistent with the desired minimum amount of insulation between the conductors 53 and the high voltage coil. The cross section of the tubular conductors 53 and 70 may be either round or oval as shown in FIG. 12. The latter oval shape as shown in FIG. 12 utilizing the tubular oval conductors 80 and 90 may be preferable when the radial width of the pressure collar-static shield combination, which is approximately equal to the radial width of the high voltage coil sections, is considerable, and when a maximum clearance is required between the tubular conductors 53 and 70.

To verify the electrical performance of the pressure collar structure employing the two shielding conductors 53 and 70, impulse flashover tests were made on three different assemblies, as follows:

Assembly #1—as shown in FIG. 10, using one shielding conductor in the pressure collar and the ground shield 50.

Assembly #2—same as above, except the ground shield 50 omitted.

Assembly #3—using a two-conductor shield-pressure collar, as shown in FIG. 11, of approximately the same dimensions as the collar in Assembly #1, except without the ground shield 50.

Tests on the above three assemblies were made using impulse flashover, in sulfur hexafluoride gas at different pressures, and for different values of the radial clearance X between the high voltage stack 13 and the low voltage coil 75, FIG. 10. Representative values of the dielectric strength, in kilovolts, obtained for $X=2$ inches and the pressure of $SF_6$ gas equal to 7½ p.s.i.g., are given below.

|  | Positive Polarity Impulse, KV | Negative Polarity Impulse, KV |
| --- | --- | --- |
| Assembly #1 | 300 | 330 |
| Assembly #2 | 186 | 197 |
| Assembly #3 | 295 | 370 |

It is apparent from the above data that the ground shield 50 cannot be omitted from the assembly FIG. 10 without seriously degrading the insulating structure. However, when the double-conductor shield 53, 70 is employed even without the ground shield 50, FIG. 10, the dielectric strength of the structure is not impaired, but rather may be improved.

The double conductor static shields shown in FIGS. 11 and 12 may be further modified to include one more function, namely that of serving as manifolds for the distribution of the cooling liquid in vapor-cooled transformers. It consists of using a tubular form of conductors 53 and 70, either circular or oval, and providing a series of orifices 54 in conductor 53. Lead 52 serves as the coolant inlet into the conductor 53, and orifices 54, which are evenly distributed around the circumference of conductor 53, serve as the outlets. Lquid discharged through these orifices 54 serves to cool the high voltage winding.

Furthermore, conductor 70 may be also provided with a series of orifices 72, directed radially toward the low voltage winding 75. Cooling liquid, supplied into conductor 70 through the grounding lead 71, is discharged through orifices 72, and is applied to the surface of the low voltage coil 75, as shown on FIG. 13, thus accomplishing cooling of the low voltage coil 75.

The use of a two conductor combination illustrated in FIG. 11 has the following advantages.

(1) They permit using standard pressure plate supports for the coils, at the same time maintaining high flashover voltage level for the insulating structure in air or gas insulated transformers.

(2) They provide means for uniform distribution of cooling liquid in both the high and the low voltage windings of vapor-cooled transformers.

(3) The two shielding conductors, when properly designed, serve as reinforcing elements in the collars, rendering a mechanically strong structure.

In conclusion, it is pointed out that while the illustrated examples constitute practical embodiments of our invention, we do not limit ourselves to the exact details shown, since modifications of the same may be varied without departing from the spirit and scope of this invention.

We claim as our invention:

1. A transformer structure, comprising; a winding; a pressure collar member disposed on said winding; an electrostatic shielding conductor disposed within said pressure collar member in close proximity to said winding to prevent flashover and corona effects from said winding and improve the dielectric strength of said pressure collar member; said shielding conductor being tubular and adapted to receive a liquid dielectric coolant; said pressure collar member and said tubular conductor having a plurality of orifices formed therein to allow distribution of said liquid dielectric coolant over said winding.

2. A transformer structure, comprising; a winding; a pressure collar member disposed on said winding; an electrostatic shielding conductor disposed within said pressure collar member in close proximity to said winding to prevent flashover and corona effects from said winding and improve the dielectric strength of said pressure collar member; said shielding conductor being tubular and adapted to receive a liquid dielectric coolant; said pressure collar member and said tubular conductor having a plurality of orifices formed therein to allow distribution of said liquid dielectric coolant over said winding; and an inlet means connected to said tubular conductor adapted to direct said liquid dielectric coolant into said tubular conductor; said inlet means comprising a tubular bus terminal for said winding.

3. A transformer structure, comprising; a winding; a hollow cylindrical pressure collar member disposed on said winding; a first electrostatic shielding conductor disposed within said pressure collar member in close proximity to said winding to prevent flashover and corona effects from said winding and improve the dielectric strength of said pressure collar member; and a second electrostatic shielding conductor disposed within said pressure collar member having a maximum insulating clearance from said first electrostatic shielding conductor; said shielding conductors being tubular and adapted to receive a liquid dielectric coolant; said tubular conductors and said pressure collar member having a plurality of orifices formed therein to provide a predetermined distribution of said liquid dielectric coolant in said transformer structure.

4. A transformer comprising a hollow cylindrical winding, a pressure collar member disposed substantially around the upper periphery of said winding and formed from an electrically insulating material, a tubular shielding member embedded in said pressure collar member and extending substantially around said periphery with said pressure collar member, said shielding member being adapted to receive a vaporizable liquid coolant, said pressure collar member and said shielding member having a plurality of aligned orifices to permit distribution of said liquid coolant downwardly over said winding to cool said winding mainly by evaporation of said liquid coolant, and inlet means connected to said shielding member, said inlet means being also electrically connected to said winding.

5. A transformer having grounded portions comprising a hollow cylindrical winding, a pressure collar member disposed around the upper periphery of said winding and formed from an electrically insulating material, and first and second tubular shielding members embedded in said pressure collar member and spaced apart from one another, said shielding members extending substantially around said periphery with said pressure collar member and being adapted to receive a vaporizable liquid coolant, said pressure collar member and each of said shielding members having a plurality of aligned orifices to permit distribution of said liquid coolant downwardly over said winding in a substantially uniform manner and to cool said winding mainly by evaporation of said liquid coolant, one of said shielding members being electrically connected to said grounded portions.

6. A transformer having grounded portions comprising a hollow cylindrical winding, a pressure collar member disposed around the upper periphery of said winding and formed from an electrically insulating material, first and second tubular shielding members embedded in said pressure collar member and spaced apart from one another, said shielding members extending substantially around said periphery with said pressure collar member and being adapted to receive a vaporizable liquid coolant, said pressure collar member and each of said shielding members having a plurality of aligned orifices to permit distribution of said liquid coolant downwardly over said winding in a substantially uniform manner and to cool said winding mainly by evaporation of said liquid coolant, one of said shielding members being electrically connected to said grounded portions, and inlet means connected to the other of said shielding members, said inlet means being also electrically connected to said winding.

References Cited by the Examiner

UNITED STATES PATENTS

| | | | |
|---|---|---|---|
| 513,422 | 1/94 | Rowland | 336—62 |
| 2,561,738 | 7/51 | Hill | 336—57 |
| 2,937,349 | 5/60 | Camilli | 336—58 |
| 3,026,492 | 3/62 | Narbut | 336—84 X |

FOREIGN PATENTS 241,515   8/46   Switzerland.

JOHN F. BURNS, *Primary Examiner.*

LARAMIE E. ASKIN, *Examiner.*